United States Patent
Engelhard et al.

(10) Patent No.: US 6,607,119 B2
(45) Date of Patent: Aug. 19, 2003

(54) METHOD AND APPARATUS FOR WELDING TWO WORK PIECES

(75) Inventors: Gerhard Engelhard, Erlangen (DE); Rainer Bauer, Herzogenaurach (DE); Dieter Pellkofer, Herzogenaurach (DE); Helmar Adams, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/962,482

(22) Filed: Sep. 24, 2001

(65) Prior Publication Data

US 2002/0030083 A1 Mar. 14, 2002

Related U.S. Application Data

(63) Continuation of application No. PCT/DE00/00784, filed on Mar. 13, 2000.

(30) Foreign Application Priority Data

Mar. 24, 1999 (DE) .......................... 199 13 324

(51) Int. Cl.⁷ ........................ B23K 31/02; B23K 20/12; B23K 37/00; B29C 65/06
(52) U.S. Cl. .................. 228/112.1; 228/112.1; 228/2.1; 156/73.5; 156/580
(58) Field of Search ................ 228/112.1, 2.1, 228/114.5; 219/118, 93, 73.5, 580; 156/73.5, 580

(56) References Cited

U.S. PATENT DOCUMENTS

| | | | | |
|---|---|---|---|---|
| 4,058,421 A | * | 11/1977 | Summo ..................... | 156/73.5 |
| 4,269,344 A | * | 5/1981 | Vervliet ...................... | 228/125 |
| 4,612,758 A | * | 9/1986 | Schumacher et al. ......... | 56/308 |
| 4,930,675 A | * | 6/1990 | Bedford et al. ............. | 148/905 |
| 5,472,601 A | * | 12/1995 | Eguchi ..................... | 228/112.1 |
| 5,579,869 A | * | 12/1996 | Ishii et al. ................... | 156/580 |
| 5,633,093 A | * | 5/1997 | Rhoda et al. ............... | 219/118 |
| 5,697,511 A | * | 12/1997 | Bampton .................... | 220/4.12 |
| 5,697,544 A | * | 12/1997 | Wykes ......................... | 156/580 |
| 5,713,507 A | * | 2/1998 | Holt et al. ................. | 228/112.1 |
| 5,718,366 A | * | 2/1998 | Colligan ..................... | 228/125 |
| 5,885,318 A | * | 3/1999 | Shimizu et al. ............. | 156/580 |
| 5,893,507 A | * | 4/1999 | Ding et al. .................. | 156/580 |
| 5,971,247 A | | 10/1999 | Gentry | |
| 5,971,252 A | * | 10/1999 | Rosen et al. ................ | 156/73.5 |
| 5,975,406 A | * | 11/1999 | Mahoney et al. ......... | 228/112.1 |
| 5,979,742 A | * | 11/1999 | Enomoto et al. ......... | 228/112.1 |
| 6,045,027 A | * | 4/2000 | Rosen et al. ............. | 228/112.1 |
| 6,045,028 A | * | 4/2000 | Martin et al. ............ | 228/112.1 |
| 6,050,474 A | * | 4/2000 | Aota et al. ................. | 156/73.5 |
| 6,168,066 B1 | * | 1/2001 | Arbegast ..................... | 219/118 |
| 6,199,745 B1 | * | 3/2001 | Campbell et al. ......... | 228/112.1 |
| 6,299,050 B1 | * | 10/2001 | Okamura et al. .......... | 156/73.5 |
| 6,315,187 B1 | * | 11/2001 | Satou et al. .................. | 56/308 |

FOREIGN PATENT DOCUMENTS

| | | | | |
|---|---|---|---|---|
| DE | 196 16 285 C1 | 7/1997 | | |
| EP | 0 615 480 B1 | 9/1994 | | |
| GB | 2 233 923 A | 1/1991 | | |
| JP | 11-47961 A | * 2/1999 | ............. | 228/112.1 |
| JP | 11 028 585 A | 2/1999 | | |
| JP | 2000-301992 A | * 10/2000 | ............. | 228/112.1 |
| WO | WO 95/26254 | 10/1995 | | |
| WO | WO 96/38256 | 12/1996 | | |
| WO | WO 98/51441 | * 11/1998 | ............. | 228/2.1 |
| WO | WO 99/33594 | * 7/1999 | | |
| WO | WO 01/17721 A1 | * 3/2001 | ............. | 228/2.1 |

* cited by examiner

*Primary Examiner*—Tom Dunn
*Assistant Examiner*—L. Edmondson
(74) *Attorney, Agent, or Firm*—Laurence A. Greenberg; Werner H. Stemer; Ralph E. Locher

(57) ABSTRACT

A method of welding two work pieces that define a connecting zone between them is described. A friction pin is fed at a starting point into the connecting zone and into opposite regions of the work pieces on both sides of the connecting zone. The friction pin is moved in a welding direction along the connecting zone resulting in the work pieces being welded. The friction pin is led out of the connecting zone after welding the work pieces. The friction pin is fed into a sacrificial element while lifting the friction pin.

20 Claims, 8 Drawing Sheets

METHOD AND APPARATUS FOR WELDING TWO WORK PIECES

CROSS-REFERENCE TO RELATED APPLICATION

This application is a continuation of copending International Application No. PCT/DE00/00784, filed Mar. 13, 2000, which designated the United States.

BACKGROUND OF THE INVENTION

Field of the Invention

The field of the invention is joining practice, and in particular welding practice.

The invention relates to a method of welding two work pieces that define a connecting zone between them. The invention also relates to an apparatus for welding two work pieces that define a connecting zone between them, having a friction pin that can be advanced into the connecting zone.

To join two work pieces, for example work pieces made of aluminum or an aluminum alloy, it is known, for example from European Patent EP 0 615 480 B1, to bring about the plasticizing or melting of the parent material by a heat input produced by friction, this plasticizing or melting being necessary for welding at the abutting, joining or connecting zone of the work pieces. Provided for this purpose is a friction welding head that contains a rapidly and cyclically moving, for example rotating, friction pin. The friction pin is made of a material that is harder than and has a higher melting point than the material of the work pieces to be joined. When two plate-shaped work pieces are being joined, the friction pin is placed laterally against the work pieces in the region of the connecting zone of the work pieces. The friction pin, on account of the plasticizing of the material caused by the rapid and cyclical movement, then penetrates into opposite regions of the work pieces, while simultaneously being moved forward along the connecting zone, and thus brings about the welding of the two work pieces during the cooling of the plasticized zone. The method is also designated as friction stir welding.

Developments and modifications of friction stir welding are described in International Patent Disclosures WO 95/26254 and WO 96/38256.

Work pieces in which the weld does not extend up to a marginal region of the work pieces often have to be welded to one another, so that the friction pin-after being inserted laterally into the work pieces-cannot leave the work pieces again laterally at another point. For example, plate-shaped work pieces must be welded only in sections along an abutting edge, in which case at least one of the sections does not extend up to the margin of the plates. In this use, there is the problem that an undesirable hole is left at the end of a weld on account of the material displacement of the friction pin when withdrawing or lifting it.

This problem also exists if a weld having a shape closed upon itself is to be produced. In particular, this problem exists when (tightly) welding two tubes, since in this case the friction pin, after a complete orbit along the tube circumference, returns to the starting point again.

In German Patent DE 196 16 285 C1, it is proposed to withdraw the friction pin slowly from the tube wall in the circumferential direction while maintaining the orbiting movement, so that a wedge-shaped run out is obtained. However, this does not completely prevent the hole produced during the radial lifting. In the region of the wedge-shaped run out, the welded tubes often have an undesirable reduction in wall thickness.

To close an undesirable bore or an undesirable hole in a work piece, it is known, for example from Published, British Patent Application GB 22 33 923 A, to insert a rapidly rotating plug into the hole while producing friction heat and to tightly close the hole with the plug. Such a procedure in connection with the welding of many tubes would be expensive, since such a friction plug would have to be supplied after every complete orbit of the friction pin, for which purpose a separate device or at least a tool change would possibly be necessary.

SUMMARY OF THE INVENTION

It is accordingly an object of the invention to provide a method and an apparatus for welding two work pieces which overcome the above-mentioned disadvantages of the prior art methods and devices of this general type, in which a hole at the finishing point of the weld, at which lifting of the friction pin takes place, is reliably avoided with little technical outlay.

With the foregoing and other objects in view there is provided, in accordance with the invention, a method of welding two work pieces that define a connecting zone between them. The method includes the steps of feeding a friction pin at a starting point into the connecting zone and into opposite regions of the work pieces on both sides of the connecting zone; moving the friction pin in a welding direction along the connecting zone resulting in the work pieces being welded; leading the friction pin out of the connecting zone after welding the work pieces; and feeding the friction pin into a sacrificial element while lifting the friction pin.

In this connection, sacrificial element refers to any element that is not required for the function of the two work pieces, for example two tubes. The method therefore achieves the advantage that the hole remaining when the friction pin is lifted does not appear in a functionally important region of the work pieces but in the sacrificial element. For example, the sacrificial element projects above the outer surface of two tubular work pieces, so that, when the hole is produced in the sacrificial element, the wall thickness of the tubes does not drop below the desired value at any point.

The sacrificial element may have any desired shape, for example the shape of a nose, a projecting length or an extension.

The friction pin works in particular according to the friction stir principle, which is accompanied by plasticizing of the opposite regions of the work pieces on both sides of the connecting zone.

In connection with the invention, lifting of the friction pin refers to any withdrawal of the friction pin from one of the work pieces or from the work pieces with at least one motion component in a direction perpendicular to the direction of the connecting zone, that is to the welding direction.

According to a preferred refinement, the sacrificial element is integrally formed on one of the work pieces as an integral part of the work piece in such a way as to form a sacrificial region. For example, the sacrificial region and the work piece are formed or produced from a single piece. In particular, the sacrificial region projects above a surface of one of the work pieces.

According to a preferred refinement, the sacrificial element is configured as a separate sacrificial body that is attached so as to be adjacent to at least one of the work pieces. Such a sacrificial body is simple to produce and requires no additional outlay when producing the work pieces.

For example, the sacrificial body is adapted at its underside to the contour of the work piece, so that as far as possible seating without a gap or free of gaps is obtained. The sacrificial body—and also the sacrificial region—preferably also extends in a direction perpendicular to the welding direction.

In an especially advantageous manner, the sacrificial body or the sacrificial region is made of the same material as the work pieces. This ensures that the hole remaining in the work pieces without the use of a sacrificial element is avoided or closed in an especially reliable manner by material from the sacrificial element.

The method is preferably used in such work pieces in which the connecting zone has a shape closed upon itself, in particular a ring shape. Such work pieces are tubes for example. In this case, the weld extends from the starting point up to a finishing point, the finishing point being identical to the starting point. For example, in the case of tubes, welding is carried out along a complete circumferential line (360°).

In a connecting zone having a shape closed upon itself, the friction pin, after completely covering the connecting zone, is preferably moved beyond the starting point. When two tubes are being welded, the friction pin performs an orbiting movement of more than 360°, that is to say beyond the closing point.

In this case, for example, a section of the connecting zone that is covered repeatedly by the friction pin is obtained. By such an overlap, which is set at a machine for example, the error tolerance of the method is advantageously increased.

In particular, the sacrificial element—as viewed in the welding direction—is attached behind the starting point, which in particular is identical to the finishing point.

According to an especially preferred refinement, in a connecting zone having a shape closed upon itself, the sacrificial element is attached at the starting point, or at a point which has already been passed by the friction pin, after the friction pin has already been moved in the welding direction. The sacrificial body is attached, for example, at an instant at which there is sufficient space for attaching it above the starting point or above a point that has already been passed by the friction pin.

During such a procedure, the friction pin, after a complete orbit, runs virtually automatically into the sacrificial body without a change in its (azimuthal) direction of movement being necessary or without an additional movement being necessary.

Alternatively, the sacrificial element—as viewed in the welding direction—is attached laterally next to the starting point, or next to a point which has already been passed by the friction pin, after the friction pin has already been moved in the welding direction. In this case, after a complete orbit of the friction pin, it may be necessary to end or change the azimuthal movement of the friction pin in such a way that the friction pin is moved into the sacrificial body laterally next to the starting point, or next to the point which has already been passed by the friction pin, after a forward movement in one of the work pieces.

According to another especially preferred refinement, the sacrificial element is attached so as to be directly adjacent to the connecting zone. This achieves the advantage that, after complete welding along the connecting zone, the friction pin can be fed into the sacrificial element without delay. In this case, a separate forward movement in one of the work pieces may not be necessary, and the lifting of the friction pin when it is being fed into the sacrificial element can take place when it is being led out of the connecting zone.

In order to keep delays to a minimum, the sacrificial element is attached at least at a distance from the connecting zone of less than the diameter of the friction pin.

According to another preferred refinement, the sacrificial element—as viewed in the welding direction—is attached laterally next to the connecting zone. This refinement is especially advantageous if the sacrificial element, as sacrificial region, is an integral part of one of the work pieces. The sacrificial region can then be integrally formed in an especially simple manner at a distance from the connecting zone without it having an adverse effect on positioning of the work pieces to be welded along the connecting zone and/or on the movement of the friction pin.

In a preferred development of the method, the sacrificial element is removed after the welding of the work pieces. The removal of the sacrificial element, once the friction pin is led out of it, may be effected, for example, by milling or cutting.

Another preferred development provides for a feed movement of the friction pin to be maintained during the lifting of the friction pin. The superimposition of the two movements results in an especially neat runout point.

The height of the sacrificial element relative to that surface of the work piece or of the work pieces which surrounds it is preferably greater than the weld depth produced. Since the weld depth produced is related to the height of the friction pin (friction surface plunging in), this ensures that the entire friction pin plunging in can be accommodated by the sacrificial element.

In this case, in particular, the expression "height" refers to the height perpendicular to the surface of the work pieces. For example, the sacrificial element projects by this height above the connecting zone perpendicularly to the welding direction.

According to another exceptionally preferred refinement, the height of the sacrificial element relative to that surface of the work piece or of the work pieces which surrounds it is spatially variable. As a result, in particular in combination with an overall movement of the friction pin superimposed from the lifting and the feed movement, a simple and neater transition from the connecting zone into the sacrificial element is achieved. In particular, the height increases (continuously) in a direction that is parallel to the direction of the feed movement of the friction pin.

According to another preferred refinement, the friction pin is therefore fed into the sacrificial element in the direction of increasing height of the sacrificial element.

For example, the sacrificial element is wedge-shaped. When two tubes are being welded, the shape of the wedge is in particular such that its top side or outer side runs at least partly tangentially to the outer circumference of the tubes.

The friction pin is preferably lifted or withdrawn in a controlled manner in such a way as to follow the contour of the sacrificial element.

The object which relates to the apparatus is achieved with respect to the apparatus of the type mentioned at the beginning in that there is a control device with which the friction pin can be withdrawn from the work piece or the work pieces in a controlled manner and with which a feed movement of the friction pin can be performed at the same time. The apparatus for welding two work pieces includes the friction pin which can be advanced into the connecting zone and can be fed into a sacrificial element, and a control device with which the friction pin can be withdrawn from the work pieces in a controlled manner and in such a way as to follow a contour of the sacrificial element and with which a feed movement of the friction pin can be performed at the same time.

The apparatus is suitable in particular for carrying out the method according to the invention. Especially advantageous in this case is the use of the apparatus if a sacrificial element having a spatially variable height is used.

The friction pin can preferably be withdrawn in an automated manner as a function of the path covered in the feed direction.

An advantageous development of the invention has a scanning body scanning the path and controlling the withdrawal movement or the lifting of the friction pin.

The scanning body and the friction pin are preferably connected via a control cylinder.

The friction pin can preferably be withdrawn in such a way as to follow a cam firmly superimposed on the control device. The cam may be realized mechanically or electronically.

According to an especially preferred refinement, the cam represents the contour of a sacrificial element.

The invention also relates to a sacrificial body for carrying out the method. The sacrificial body is in particular a separate body that can be placed against at least one of the work pieces. Possible refinements and advantages of the sacrificial body can be gathered from the description of the method according to the invention.

Furthermore, the invention also relates to a work piece having a sacrificial region for carrying out the method according to the invention. In particular, the sacrificial body is integrally formed on one of the work pieces as an integral part of this work piece.

Other features which are considered as characteristic for the invention are set forth in the appended claims.

Although the invention is illustrated and described herein as embodied in a method and an apparatus for welding two work pieces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
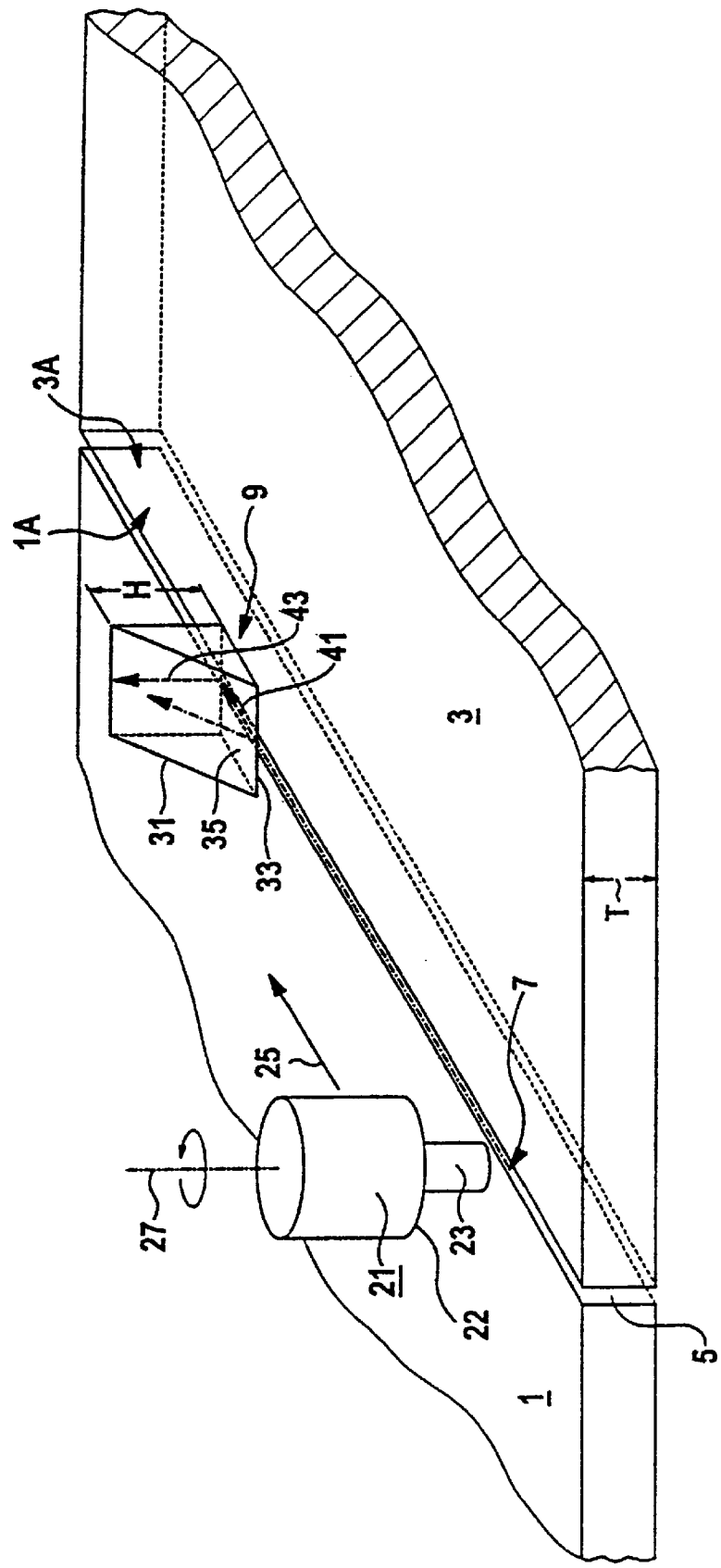
FIG. 1 is a fragmentary, perspective view of a first exemplary embodiment of a method according to the invention.

Referring now to the figures of the drawing in detail and first, particularly, to FIG. 1 thereof, there is shown plate-shaped work pieces 1, 3 which are disposed so as to abut against one another along their side faces 1A, 3A and which define by the side faces 1A, 3A a connecting zone 5 between the work pieces 1, 3. The work pieces 1, 3 may touch one another with their side faces 1A, 3A largely free of gaps or may have, for example, a small clearance space, related to production (but undesirable), between their side faces 1A, 3A.

The work pieces 1, 3 are to be welded to one another along the connecting zone 5, beginning at a starting point 7 up to a finishing point 9 at a distance from a margin of the work pieces 1, 3. To this end, a welding head 21 working according to the friction stir welding principle and having a friction pin 23 is fed at the starting point 7 into the connecting zone 5 and into opposite regions or zones of the work pieces 1, 3 on both sides of the connecting zone 5. After reaching a predetermined penetration depth, the friction pin 23 is moved in a welding direction 25 along the connecting zone 5.

When being fed in and when moving forward, the friction pin 23 is set in rapid rotation about a rotation axis 27 by a not explicitly shown motor drive. The material is heated and plasticized by the friction pin 23 and at the same time a pressure is applied to the connecting zone 5 of the two work pieces 1, 3 bearing against one another. To this end, the welding head 21 has a bearing shoulder 22. The plasticized material is transported by the rotary movement to the rear side of the friction pin 23 and compressed by the bearing shoulder 22 and a non-illustrated profiled portion of the friction pin 23. A firm connection is produced upon cooling without the melting point having been reached.

After movement in the welding direction 25, it is necessary to remove the friction pin 23 from the connecting zone 5 and the work pieces 1, 3 at the finishing point 9. On account of the material displacement by the friction pin 23, a hole would be produced in the process at the finishing point 9 and the hole would have to be filled with a filler material.

According to the invention, therefore, a wedge-shaped sacrificial body 31 is clamped, pressed or welded on at the finishing point 9, which sacrificial body 31 has been placed on the work pieces 1, 3 after they have been pressed together. A tip 33 of the sacrificial body 31 faces the welding head 21 to be moved toward it. With its underside 35, the sacrificial body 31 lies in such a way as to overlap the connecting zone 5 on both work pieces 1, 3.

A maximum height H of the sacrificial body 31 is greater than a weld depth T, so that the friction pin 23 can be completely enclosed by the sacrificial body 31.

The friction pin 23 is fed into the sacrificial body 31 in the direction of increasing height H of the sacrificial body 31. In the process, a withdrawal movement 43—leading to the lifting of the friction pin 23 relative to the work piece surfaces—is superimposed on a continuous feed movement 41 along the connecting zone 5. In other words, the friction pin 23 is lifted in such a way as to follow the contour of the sacrificial body 31 until its lower tip no longer plunges into the connecting zone 5 or one of the work pieces 1, 3.

Figure 2:
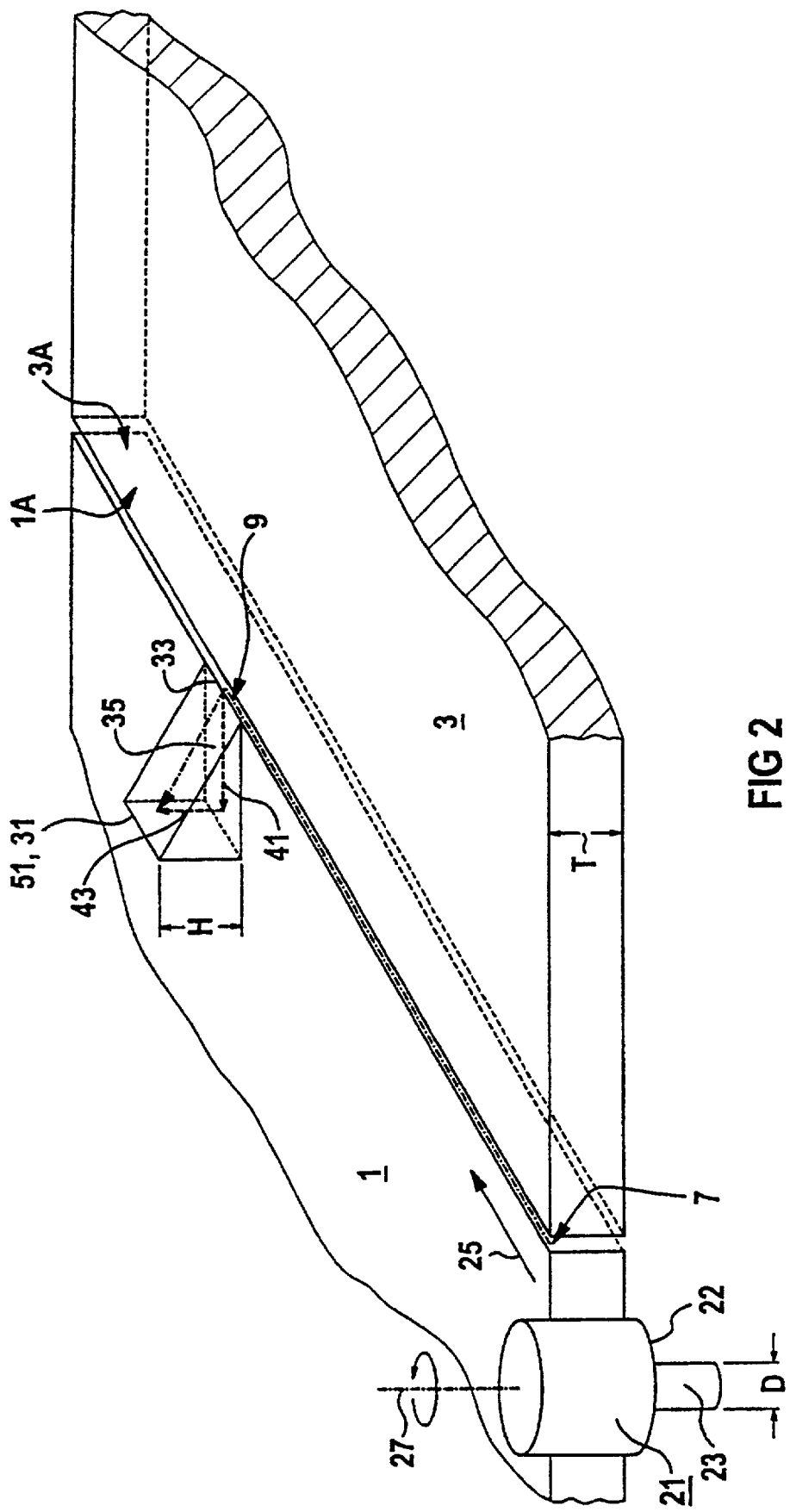
FIG. 2 is a fragmentary, perspective view of a second exemplary embodiment of the method according to the invention.

In the second exemplary embodiment shown in FIG. 2, the sacrificial body 31, as viewed in the welding direction 25, is attached laterally next to the connecting zone 5 and is directly adjacent to the latter with its tip 33. Instead of the sacrificial body 31, a sacrificial region 51 may be integrally formed on one of the work pieces 1, 3 as an integral part of one of the work pieces 1, 3. The sacrificial body 31 and the sacrificial region 51 are jointly designated below as the sacrificial element.

In FIG. 2, the sacrificial element 31, 51 is rotated by 90° relative to the configuration shown in FIG. 1. Once the friction pin 23 has been moved up to the finishing point 9, a feed movement 41, rotated by 90° in relation to this, into the sacrificial element 31, 51 takes place. A withdrawal movement 43 is superimposed on the feed movement 41—as in the first exemplary embodiment—so that the bearing shoulder 22 follows the wedge-shaped profile of the sacrificial element 31, 51.

Figure 3:
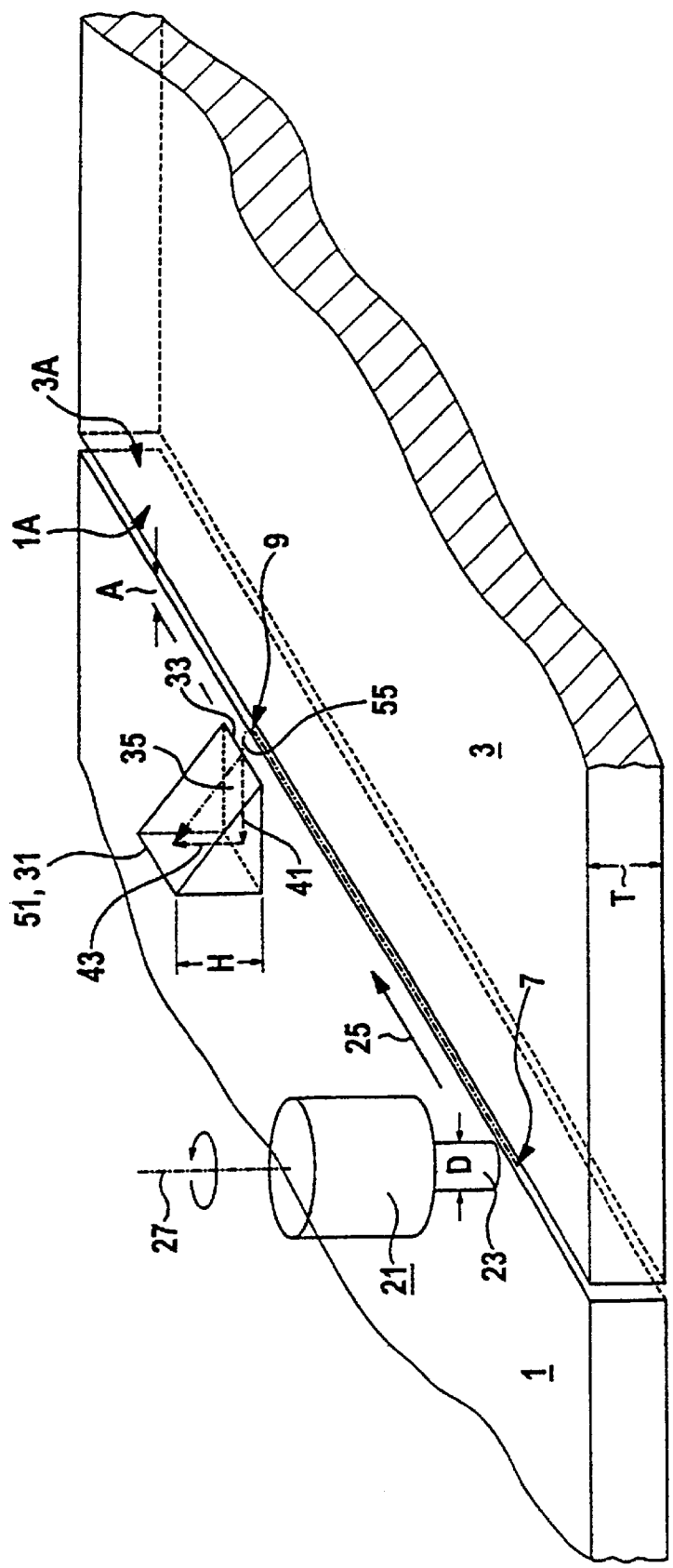
FIG. 3 is a fragmentary, perspective view of a third exemplary embodiment of the method according to the invention.

The third exemplary embodiment shown in FIG. 3 largely corresponds to the exemplary embodiment shown in FIG. 2, with the difference that the sacrificial element 31, 51 is attached at a distance A from the connecting zone 5 of less than a diameter D of the friction pin 23. As in FIG. 2, the direction of movement of the friction pin 23 is pivoted by 90° after reaching the finishing point 9, and the friction pin 23 is led out of the connecting zone 5. In contrast to FIG. 2, the withdrawal movement 43 does not start as soon as the friction pin 23 begins to leave the connecting zone 5. On the contrary, a forward movement 55 in only one of the work pieces 1 first takes place until the friction pin 23 reaches the tip 33 of the sacrificial element 31, 51. Not until then does the lifting of the friction pin 23 start as a result of the withdrawal movement 43 and with the feed movement 41 being maintained at the same time.

Figure 4:
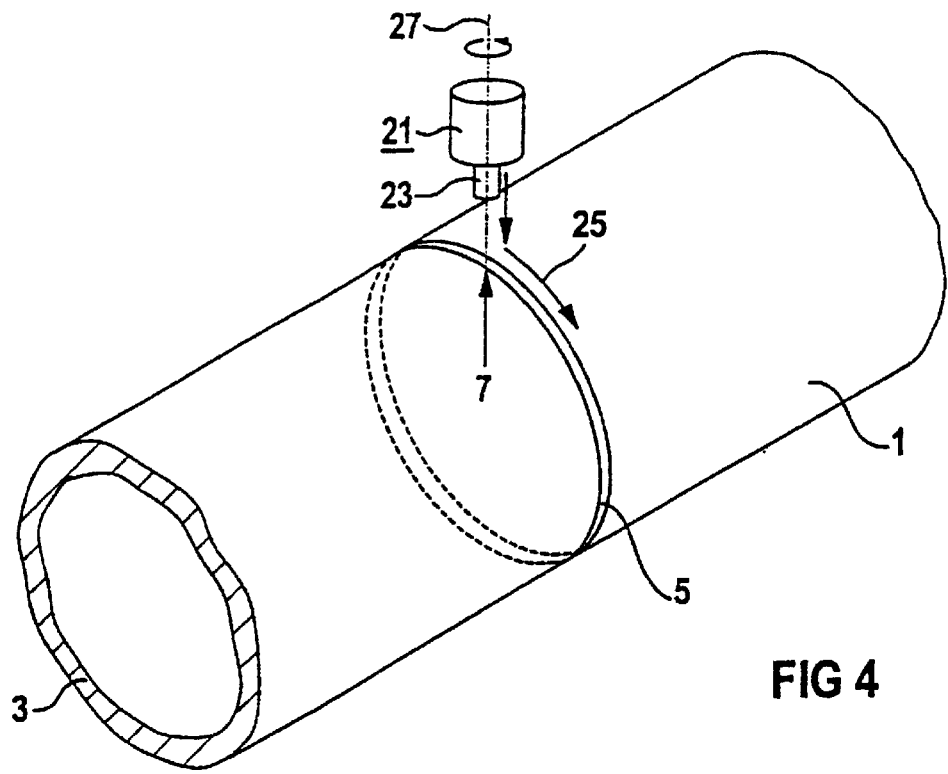
FIG. 4 is a fragmentary, perspective view of a fourth exemplary embodiment of a method according to the invention at a first instant.

In the fourth exemplary embodiment in FIG. 4, the work pieces 1, 3 are tubular articles, so that the connecting zone 5 has a shape closed upon itself, specifically a ring shape. A circumferential weld is produced. At the first instant shown in FIG. 4, the welding head 21 with the friction pin 23 is fed in radially, i.e. advanced radially, into the connecting zone 5 at the starting point 7 and starts to weld the work pieces 1, 3 in the circumferential direction along the connecting zone 5 in the welding direction 25.

Figure 5:
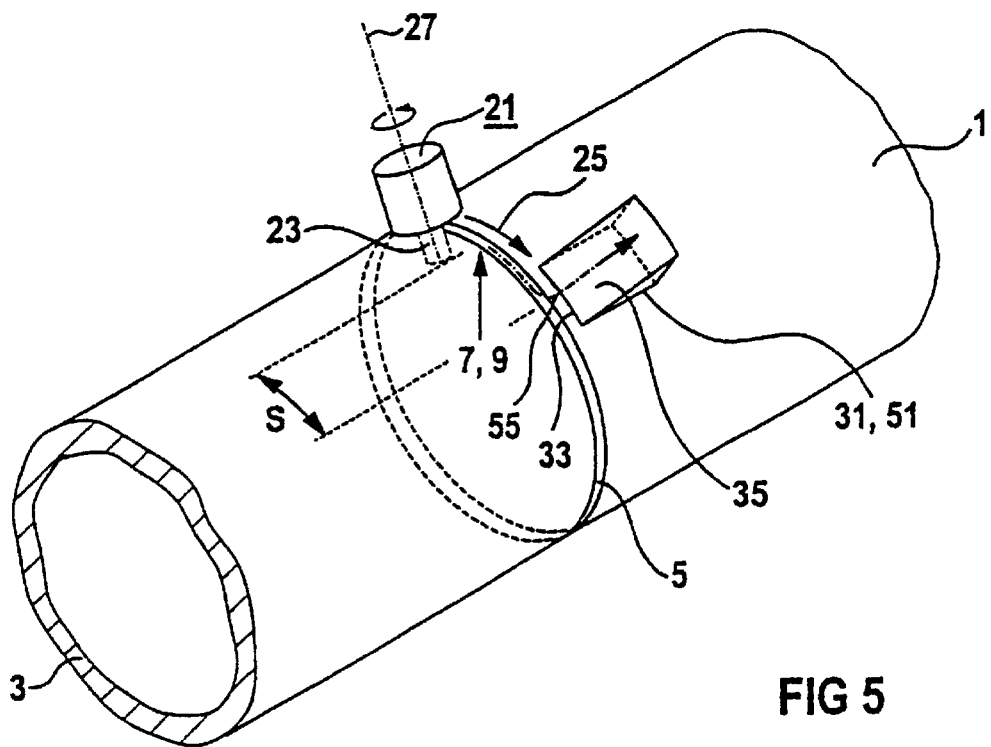
FIG. 5 is a fragmentary, perspective view of the exemplary embodiment shown in FIG. 4 at a later instant.

At a later instant shown in FIG. 5, the friction pin 23, after a complete orbit of 360°, has virtually reached the finishing point 9 again, which coincides with the starting point 7. However, the friction pin 23 is moved beyond the starting point 7 by a distance S until it is fed into the sacrificial element 31, 51 in a manner similar to FIG. 3. In this case, the distance S is thus covered repeatedly by the friction pin 23, as a result of which it is ensured, with great error tolerance, that a complete circumferential line has been welded in a fluid-tight manner. The distance S is at least as large as the diameter D of the friction pin 23.

Figure 6:
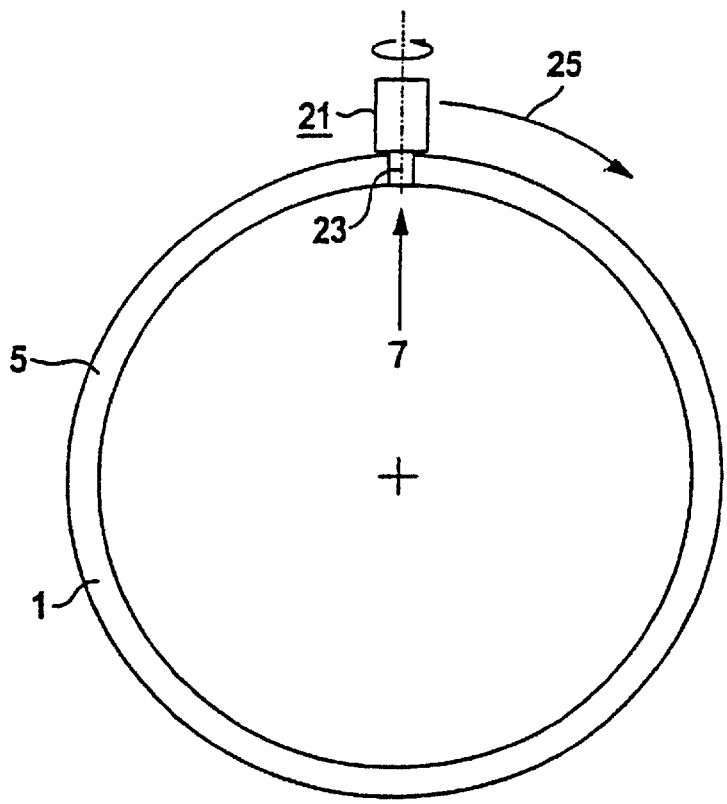
FIG. 6 is a side-elevational view of a fifth exemplary embodiment of the method according to the invention at a first instant.

FIG. 6 shows a fifth exemplary embodiment in which the work pieces 1, 3 are likewise tubes, which are shown in the line cross section. At the first instant shown in FIG. 6, the friction pin 23 has already been fed into the wall of the work pieces 1, 3 and is starting with the movement in the welding direction 25.

Figure 7:
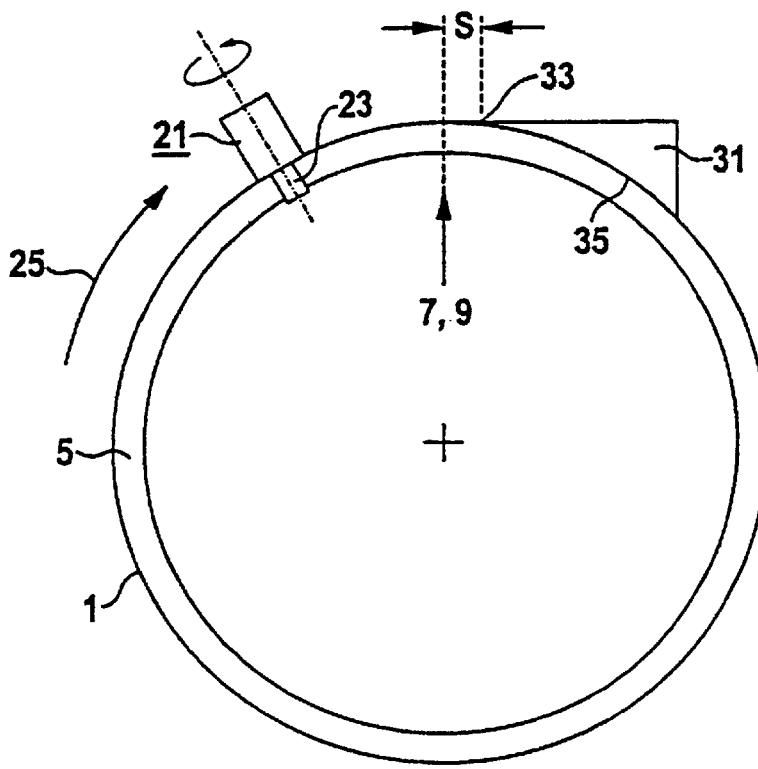
FIG. 7 is a side-elevational view of the exemplary embodiment shown in FIG. 6 at a later second instant.

FIG. 7 shows the welding head at a second instant, just before it reaches the starting point 7 again after a complete orbit. Between the first instant in FIG. 6 and the second instant in FIG. 7, the sacrificial body 31 (runout wedge) has been attached to the work pieces 1, 3 after the friction pin 23 has already passed this point. The friction pin 23, while maintaining its orbiting movement, therefore runs directly into the sacrificial body 31, this being shown in FIG. 8. To this end, as in the preceding exemplary embodiments, the withdrawal movement 43 takes place when the tip 33 of the sacrificial body 31 is reached. As also shown in FIG. 5 in an analogous manner, the sacrificial body 31, as viewed in the welding direction 25, is attached behind the starting point 7, so that the distance S that increases the error tolerance and is covered repeatedly is formed between the starting point 7 (identical to the finishing point 9) and the tip 33.

The wedge-shaped sacrificial body 31 is adapted with its underside to the tube curvature.

Figure 8:
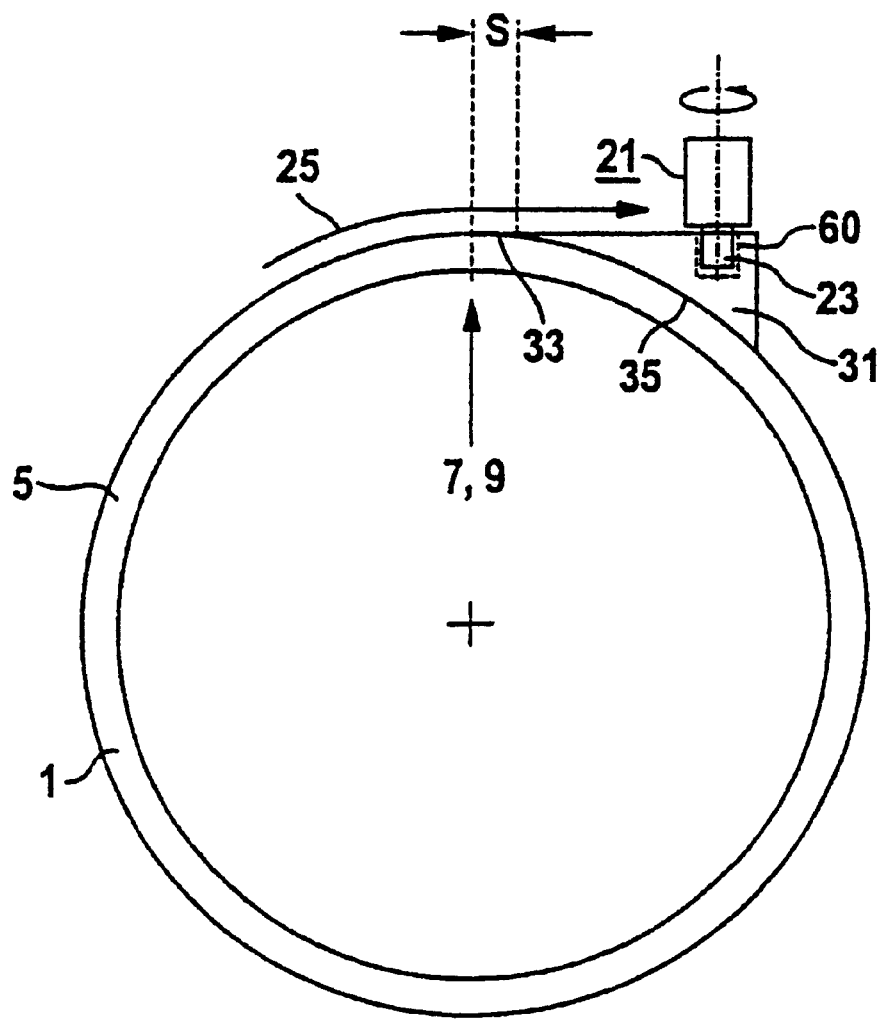
FIG. 8 is a side-elevational view of the exemplary embodiment in FIGS. 6 and 7 at a later third instant.

FIG. 8 shows how the feed movement 41 and the withdrawal movement 43 (FIGS. 1 to 3) are together superimposed to produce a tangential runout from the work pieces 1, 3 and the connecting zone 5. After this runout, the friction pin 23 is removed from the sacrificial body 31, so that a runout hole 60, which would have been produced in the tube wall of the work pieces 1, 3 without an attached sacrificial body 31, is left behind.

After the friction pin 23 has been removed from the sacrificial body 31, the latter is milled off until a smooth circular outer contour is formed at this point.

Figure 9:
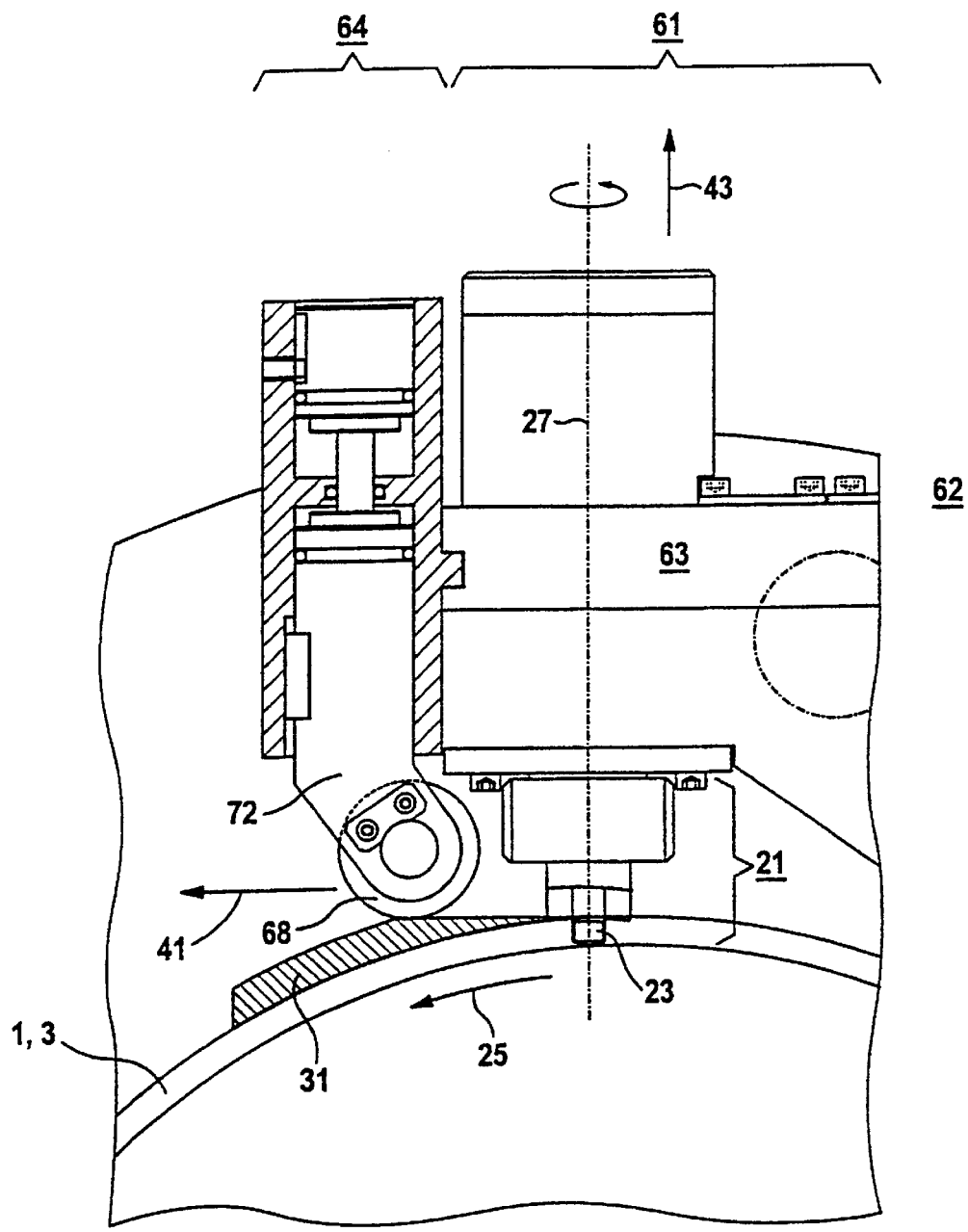
FIG. 9 is a sectional view of a first exemplary embodiment of an apparatus according to the invention.

FIG. 9 shows a first exemplary embodiment of an apparatus 62 according to the invention, which has a welding unit 61 and a control device 64. The welding unit 61 contains a drive unit 63 and the welding head 21 driven by the drive unit 63 and having the friction pin 23. The friction pin 23 can be withdrawn (withdrawal movement 43) from the work piece 1, 3 or the work pieces 1, 3 in a controlled manner with the control device 64, in the course of which the feed movement 41 can be performed at the same time.

According to FIG. 9, the control device 64 contains a scanning body 68 that is configured as a wheel and with which the path covered in the feed direction 41 can be scanned. The movement of the scanning body 68 can be transmitted via a control cylinder 72 to the welding head 21 and thus to the friction pin 23. In this way, the withdrawal movement 43 of the friction pin 23 can be controlled with the scanning body 68.

Figure 10:
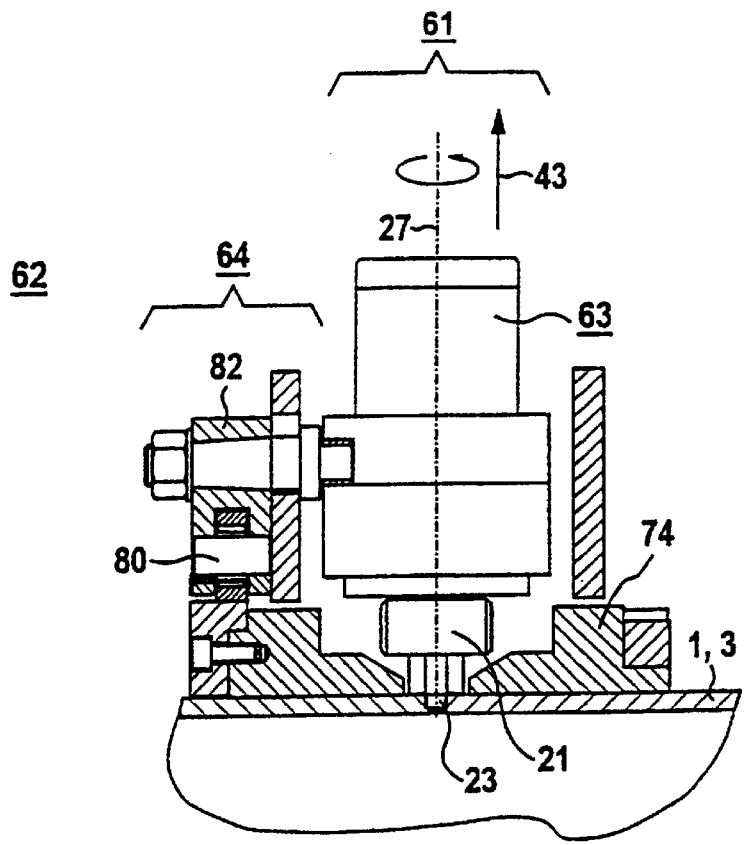
FIG. 10 is a longitudinal sectional view of a second exemplary embodiment of the apparatus according to the invention taken along work pieces.

FIG. 10 shows a second exemplary embodiment of the apparatus 62 according to the invention. It can also be seen from the longitudinal section along the tubes 1, 3 in FIG. 10 that the welding head 21 is guided along a guide rail 74 in the circumferential direction of the tubes.

Figure 11:
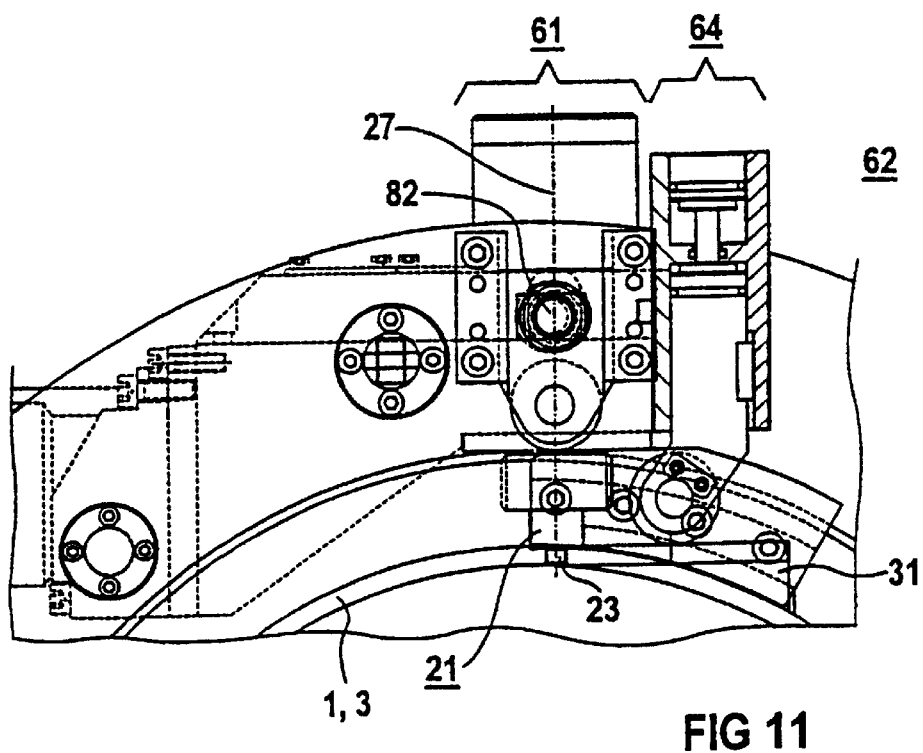
FIG. 11 is a sectional view of the exemplary embodiment in FIG. 10 in a cross section with regard to the work pieces.

In the exemplary embodiment shown in FIG. 10—and in FIG. 11 in a cross section of the work pieces 1, 3 (tubes)—the withdrawal movement 43 is controlled via a cam 80 which is firmly superimposed on the control device 64. The cam 80 represents the contour of the sacrificial body 31, so that, by superimposing the feed movement 41 and the withdrawal movement 43, the friction pin 23 can be lifted in a controlled manner in such a way as to follow the contour of the sacrificial body 31. The cam 80 is connected to the welding machine 63 via a control slide 82.

We claim:

1. A method of welding two work pieces that define a connecting zone between them, which comprises the steps of:

feeding a friction pin at a starting point into the connecting zone and into opposite regions of the work pieces on both sides of the connecting zone;

moving the friction pin in a welding direction along the connecting zone resulting in the work pieces being welded;

leading the friction pin out of the connecting zone after welding the work pieces; and feeding the friction pin into a sacrificial element while lifting the friction pin.

2. The method according to claim 1, which comprises forming the sacrificial element integrally on one of the work pieces as an integral part of one of the work pieces in such a way as to form a sacrificial region on one of the work pieces.

3. The method according to claim 1, which comprises configuring the sacrificial element as a separate sacrificial body which is attached so as to be adjacent to at least one of the work pieces.

4. The method according to claim 1, which comprises forming the connecting zone as a shape closed upon itself.

5. The method according to claim 4, which comprises moving the friction pin beyond the starting point, after the friction pin completely covers the connecting zone.

6. The method according to claim 4, which comprises attaching the sacrificial element, as viewed in the welding direction, behind the starting point.

7. The method according to claim 3, which comprises attaching the sacrificial element at one of the starting point and at a point which has already been passed by the friction pin, after the friction pin has already been moved in the welding direction.

8. The method according to claim 3, which comprises attaching the sacrificial element, as viewed in the welding direction, laterally next to the starting point, after the friction pin has already been moved in the welding direction.

9. The method according to claim 1, which comprises attaching the sacrificial element at a distance from the connecting zone, the distance being less than a diameter of the friction pin.

10. The method according to claim 1, which comprises attaching the sacrificial element, as viewed in the welding direction, laterally next to the connecting zone.

11. The method according to claim 1, which comprises removing the sacrificial element after the welding of the work pieces.

12. The method according to claim 1, which comprises maintaining a feed movement of the friction pin during the lifting of the friction pin.

13. The method according to claim 1, which comprises setting a height of the sacrificial element, relative to surfaces of the work pieces that surround the sacrificial element, to be spatially variable.

14. The method according to claim 13, which comprises forming the sacrificial element to be wedge-shaped.

15. The method according to claim 1, which comprises feeding the friction pin into the sacrificial element in a direction of increasing height of the sacrificial element.

16. The method according to claim 1, which comprises lifting the friction pin in a controlled manner in such a way as to follow a contour of the sacrificial element.

17. The method according to claim 1, which comprises performing a forward movement of the friction pin before performing the step of feeding the friction pin into the sacrificial element while lifting the friction pin.

18. The method according to claim 1, which comprises forming the connecting zone as a ring shape.

19. The method according to claim 3, which comprises attaching the sacrificial element, as viewed in the welding direction, next to a point which has already been passed by the friction pin, after the friction pin has already been moved in the welding direction.

20. The method according to claim 1, which comprises attaching the sacrificial element so that the sacrificial element is directly adjacent to the connecting zone.

* * * * *